United States Patent [19]

Ajami et al.

[11] 4,038,459
[45] July 26, 1977

[54] HALOGEN COMPLEXING ALCOHOLS AND NITRILES

[75] Inventors: Alfred M. Ajami, Boston; Fraser M. Walsh, Arlington; Dennis N. Crouse, Melrose, all of Mass.

[73] Assignee: Eco-Control, Inc., Cambridge, Mass.

[21] Appl. No.: 667,590

[22] Filed: Mar. 17, 1976

[51] Int. Cl.² .................. H01M 8/08; H01M 4/60
[52] U.S. Cl. .................................. 429/15; 429/29; 429/50; 429/101; 429/198; 429/70
[58] Field of Search ............. 429/15, 46, 101, 105, 429/198, 201, 199, 13, 50, 51, 21

[56] References Cited

U.S. PATENT DOCUMENTS 3,811,945  5/1974  Rossi ................................ 429/198
3,816,177  6/1974  Walsh ............................... 429/201

Primary Examiner—Donald L. Walton
Attorney, Agent, or Firm—Anthony M. Lorusso

[57] ABSTRACT

Halogen complexing alcohols and nitriles are disclosed as additives for use in complexing halogens in cells and batteries of the type which utilize the electrochemical reaction $X_2 \rightleftharpoons 2X^-$, where X is Br, Cl, I, or a combination of these halides. The alcohols and nitriles form insoluble oil-like complexes with the halogens which prevent the halogens from being dissolved in the electrolyte of the cell or battery in which they are used.

24 Claims, 4 Drawing Figures

HALOGEN COMPLEXING ALCOHOLS AND NITRILES

BACKGROUND OF THE INVENTION

This invention relates to compounds useful for complexing halogens and more particularly to compounds useful as an electrolyte additive for electrochemical cells and batteries of the type which utilize a halogen as its electrochemically active agent.

Voltaic cells which include an aqueous solution of zinc of cadmium halide as an electrolyte are known, but are frequently characterized by a relatively high self-discharge rate, low capacity, and high internal resistance. Since elemental halogen is soluble in the aqueous electrolyte, it is difficult to keep metallic zinc or cadmium and elemental halogen apart while simultaneously achieving a system in which a good percentage of the theoretical energy storage capacity can be realized.

Recently, various attempts have been made to prevent elemental halogen from migrating to the zinc or cadmium electrode. For example, U.S. Pat. No. 3,352,720 to G. R. Wilson et al, teaches the use of water insoluble polymeric amine halogen complexes in place of the elemental halogen. While the structures disclosed by Wilson et al. function as halogen cells, they nevertheless suffer from less than optimum capacities and self-discharge rates because of the low stability of the polyhalogens employed.

U.S. Pat. No. 3,816,177 to Myles A. Walsh, teaches the use of soluble quaternary ammonium halides and the like which may be dissolved in the electrolyte together with a water soluble depolarizer. When elemental halogen is released into the electrolyte, it combines with the quaternary halide to form a quaternary polyhalide quaternary complexes with the depolarizer to form an insoluble, halogen rich, oil-like complex. If an inert electrode made of a material which absorbs the insoluble complex is employed, an improved cell is provided, since the complex is relatively stable and since the halogen molecules, being concentrated about the current collector, are available for electrochemical reaction to an improved degree.

Still another improvement in halogen electrochemical cells is disclosed in U.S. Patent application Ser. No. 652,780 (attorney's docket no. EC-LO-002) to Myles A. Walsh et al, entitled Halogen Electrode, filed Jan. 27, 1976. The structure disclosed by this application is a novel electrode which comprises a current collecting matrix which has an extremely stable polymer containing quaternary ammonium, phosphonium, or sulfonium sites incorporated into its structure. Since the polymer is formed in the presence of a high surface area, porous, current collecting matrix, the electrodes are capable of storing halogens in a nonchemically active but highly electrochemically active state in such a manner that uniform, intimate electrical contact is maintained between the halogen-rich sites of the polymer and the current collector, and interaction between halide in the electrolyte and the quaternary sites is greatly facilitated.

The instant invention constitutes a further improvement in the halogen cell art and provides a large number of compounds, any one of which may be added to the electrolyte of halogen cells of the type described. The compounds of the invention eliminate the necessity of a depolarizer or a specially fabricated electrode, yet provide increased halogen complexing ability, enhancing the shelf-life and capacity of the cells and batteries in which they are used.

SUMMARY OF THE INVENTION

In general, the invention features compounds useful as additives to the electrolyte of halogen cells and batteries for complexing halogen. The additive is chosen from the group consisting of compounds having the formula:

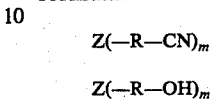

where R is an aliphatic group containing 1 to 8 carbon atoms, $m$ is a number from 1 to 6, and Z is a chemical functionality which does not render the additive's halogen complex crystalline at 30° C and may be, for example, alkyl, amide, carbocycle, carboxylate, halocarbon, halide, hydrogen, phosphonate, siloxane, sulfonate, sulfone, sultone, and Z may be chosen from among halogen complexing functionalities such as ammonium, ammonium hydrohalide, amidimidine, amine oxide, betaine, ester, ether, phosphobetaine, phosphonium, pyridinium, pyridyl, quaternary ammonium, quaternary O-alkyl hydroxylammonium, sulfobetaine, sulfonium, sydnone, tertiary amine hydrohalide, and combinations thereof.

Accordingly, it is an object of this invention to provide a halogen complexing alcohol and nitrile which are useful as an electrolyte additive for the cells and batteries of the type described which, by complexing elemental halogen in the electrolyte, is capable of greatly improving the performance of halogen utilizing electrochemical systems.

Another object of the invention is to provide a large number of compounds, any of which may be added to zinc or cadmium halide electrolytes to complex and hold halogens more efficiently than the aforementioned polymeric amine halogen complexes and the quaternary ammonium polyhalide - depolarizer systems, thereby increasing shelf life and decreasing self-discharge of the cells and batteries in which the complexing compound is used.

Yet another object of the invention is to provide a compound capable of complexing halogens in an electrochemical cell or battery which eliminates the necessity of adding a depolarizer to the electrochemical system.

Still another object of the invention is to provide compounds which, when complexed with one and more than one molar equivalent of halogen for every alcohol or cyano group in the compounds, comprise insoluble liquids in aqueous metal halide solutions when maintained at +30° C which partition from this aqueous electrolyte to provide a source of halogen that may be utilized in a halogen cell or battery.

Yet another object of the invention is to provide compounds which when complexed and maintained below 30° C with one and more than one equivalent of halogen, comprise reasonably conductive liquids allowing the halogens to undergo electrochemical reduction on the electrode of a halogen cell or battery at a reasonable rate.

Another object of the invention is to provide a large number of compounds which do not form crystalline zincates when placed in aqueous zinc halide solutions.

Still another object of the invention is to provide compounds which when complexed with one and more than one molar equivalent of halogen comprise liquids at +30° C which can be pumped, stored indefinitely, and thereby used in a regenerative fuel cell or battery for storing bromine and which do not structurally alter carbon electrodes or some plastics which elemental halogens quickly degrade.

DESCRIPTION OF THE PREFERRED EMBODIMENT

Figure 1:
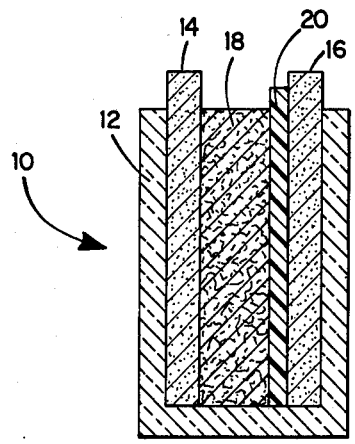
FIG. 1 is a cross-sectional view of a cell of the type with which the complexing compounds of the invention are useful; and, FIG. 2 is a graph of voltage vs. ampere hours/square foot of electrode surface which illustrates the improved storage capacity of cells constructed in accordance with FIG. 1 when a complexing compound of the invention is added to the electrolytes.

At the outset, it is desirable to comment on certain terms that are used throughout this specification and claims. For example, the terms "zinc electrode" and "bromine electrode" are not intended to imply that the electrodes are formed from these materials exclusively. As is conventional practice, the terms are used merely to indicate the electrochemically active element reacting. The metal and halogen electrodes of the cells with which the compounds of the present invention are employed, are electrically conductive, and preferably porous and noncorrosive. Carbon in its various forms is a preferred material. The carbon of the metal electrode serves as a plating surface for zinc or cadmium.

Furthermore, although reference is made to one counter electrode and one metal electrode, it is obvious that the compounds of the invention are useful in cells which include more than one pair of electrodes and with batteries of two or more cells constructed in accordance with methods known to those skilled in the art. Because cadmium is electrochemically similar to zinc, it is also obvious that the zinc of the electrode and the electrolyte can be replaced by cadmium. Although bromine is used throughout this specification and claims, it will be apparent to those skilled in the art that chlorine, iodine, or any combination of bromine, chlorine, and iodine may be substituted therefore. Although reference is made to the addition of one additive a mixture of additives may be used in any one cell.

During discharge of the well-known zinc bromine cell the following half reactions occur:

at cathode $Br_2 + 2e^- \rightarrow 2Br^-$ at anode $Zn^0 \rightarrow Zn^{++} + 2e^-$ On charging, the reactions are reversed:

at cathode $2Br^- \rightarrow Br_2 + 2e^-$ at anode $Zn^{++} + 2e^- \rightarrow Zn^0$ The zinc bromide of the electrolyte is hence consumed during charging and produced during discharging. In order for the cell to function properly, $Br_2$, which obviously must be present near the cathode when the cell is undergoing discharge, must somehow be stored. Since $Br_2$ is soluble in water containing dissolved metal halides, precautions must be taken to prevent it from migrating through the aqueous electrolyte and reacting directly with the metallic zinc at the anode. This goal has been reached by incorporating a porous, conducting, preferably carbon matrix of the type disclosed in U.S. Pat. No. 3,816,177 to M. A. Walsh, entitled Secondary Cells and Batteries, the disclosure of which is incorporated herein by reference, and one or more of the compounds of the invention, into an otherwise conventional halogen cell. When the electrolyte with the alcohol or nitrils of the invention is absorbed into the porous electrode, bromine produced during charging is complexed by the alcohol or nitrile and prevented from solubilizing in the aqueous electrolyte.

It is known that alcohols and nitriles can form complexes with halogens. See, for example, C. K. Prout and J. D. Wright, Angew, Chem., Internat. Edn. 7, 659 (1968) and H. Negita, et al., Bull. Chem. Soc. Japan, 46, 2662 (1973). In accordance with the present invention, it has been discovered that an ancohol or nitrile is quite effective for storing the halogens disclosed above, especially bromine, in an electrochemically active but non-chemically active state and that the performance of halogen cells and batteries may be significantly improved if such compounds are added to conventional zinc or cadmium halide electrolytes.

The complexing compounds of this invention are substances having the following structural formulae:

$$Z(-R-CN)_m$$

$$Z(-R-OH)_m$$

where R is an aliphatic group containing 1 to 8 carbon atoms, m is a number from 1 to 6, and Z is chosen from a large group of chemical functionalities which prevent crystallization of the complex at 30° C or which increase the amount of halogen held in the complex. These functional groups include but are not limited to: neutral groups such as alkyls, amides, carbocyles, esters, ethers, halocarbons, halides, hydrogen, hydroxyls, nitriles, phosphonate esters, pyridyls, siloxanes, sulfonate esters, sulfones, sultones, and tertiary amines; amphoteric groups such as amidimidines, betaines, phosphobetaines, sulfobetaines, and amine oxides; meso-ionic groups such as sydnones; anionic groups such as carboxylates, phosphonates, and sulfonates; cationic groups such as ammoniums, ammonium hydrohalides, phosphoniums, pyridiniums, quaternary ammoniums, quaternary O-alkyl hydroxylammoniums, and tertiary amine hydrohalides. Ammonium, ammonium hydrohalide, amidimidine, amine oxide, betaine, ester, ether, phosphobetaine, phosphonium, pyridinium, pyridyl, quaternary ammonium, quaternary O-alkyl hydroxylammonium, sulfobetaine, sufonium, sydnone, and tertiary amine hydrohalide are non-limiting examples of functionalities which provide additional halogen complexing capability.

Alcohols and nitriles of the present invention when used in voltaic halogen cells and batteries to store bromine are advantageous because no other compound need be added and, as will be explained below, they complex with halogens more efficiently than the two-part system described in U.S. Pat. No. 3,816,177, thereby increasing shelf-life and decreasing self-discharge of the cells. Because the bromine complexes do not crystallize but remain fluid below 30° C they are capable of being discharged at low temperatures.

The mechanism by which halogens are believed to be complexed with the alcohols and nitriles is diagrammed below (see C. K. Prout and J. D. Wright, Angew, Chem., Internat. Edn., 7, 659 (1968) and A. I. Popov and W. A. Deskin, J. Am. Chem. Soc., 80, 2976 (1958).

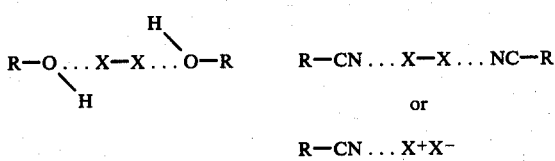

Thus, as the number of hydroxyl or cyano groups in a given compound is increased, the compound's capacity to hold $Br_2$, $Cl_2$, $I_2$, or a polyhalide is increased. However, competing interactions and steric influences also affect the complexing, and in practice, the relationship of the amount of halogen complexed to the number of hydroxyl or cyano groups present is non-linear.

Methods of synthesizing compounds of the type described above are generally well known in the art and are summarized below:

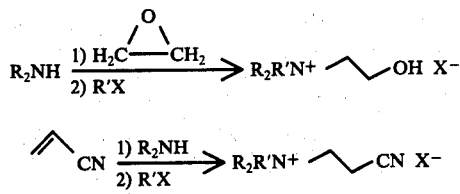

Various modifications, well known to those skilled in the art, can produce a wide variety of the types of compounds disclosed. Quaternization of commercially available hydroxyethyl or hydroxypropyl amines may be used to advantage, and functionalities capable of complexing halogen other than the hydroxyl or cyano groups may be incorporated. Two successful compounds were prepared as follows:

Example A: In a 100 ml round-bottomed flask, 3-diethyl amino-1-propanol (13.1 g) in methanol (500 ml) was stirred and ethyl bromide (12.0 g) was added. The reaction mixture was warmed to 55°–60° below a water cooled condensor for 18 hr. The methanol was removed at reduced pressure and the residue was crystallized from acetone-ethyl ether yielding 16 g (75%) of a white crystalline alcohol (ECO-1) mp 180° according to the reaction:

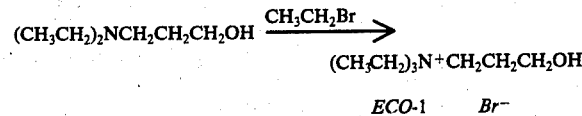

Example B: In a 250 ml round-bottomed flask, 3-diethylaminopropionitrite (12.6 g) in methanol (100 ml) was stirred and methyl bromide (19.0 g) was added at 0°. The reaction mixture was stirred for 24 hrs at 25° and then concentrated at reduced pressure. The residue was recrystallized from ethyl ether-ethanol yielding 15.7 g (71%) of a white crystalline nitrile (ECO-4) mp 176°–178° according to the reaction:

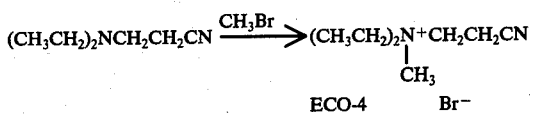

Water soluble dipolar additives such as tetramethylene sulfone (sulfolane) tend to decrease the halogen holding power of the alcohols and nitriles. Water insoluble additives such as halogenated hydrocarbons (methylene chloride) also slightly decrease the halogen holding power of the alcohols.

Referring to FIG. 1, a cell 10 is shown which comprises a case 12, a pair of graphite electrodes 14, 16, a graphite-felt mass 18, and a porous polymeric separator 20. Graphite electrode 14 acts as the bromine electrode; electrode 16 acts as the zinc electrode. Electric leads (not shown) are connected to the electrodes by means of clips. Electrodes 14, 16 have a porosity of 26%. Suitable graphite felt is available commercially from Union Carbide Corporation (VWF grade), and a suitable separator may be purchased from W. R. Grace, Inc. under the tradename DARAMIC. The electrolyte of the cell comprises inorganic salts, such as zinc halide, or cadmium halide, up to 50% of one or more of the compounds described above, and may include 0 to 30% of one or more of various additives for improved metal plating.

To demonstrate the effect of the compounds of the invention, a cell with a stationary electrolyte as described above was charged until more than 80% of the zinc halide initially in solution was converted into zinc and halogen. Charging current densities ranged typically from 5 to 25 amperes per square foot. All cells were tested at a constant current drain for a variety of current densities.

Figure 2:
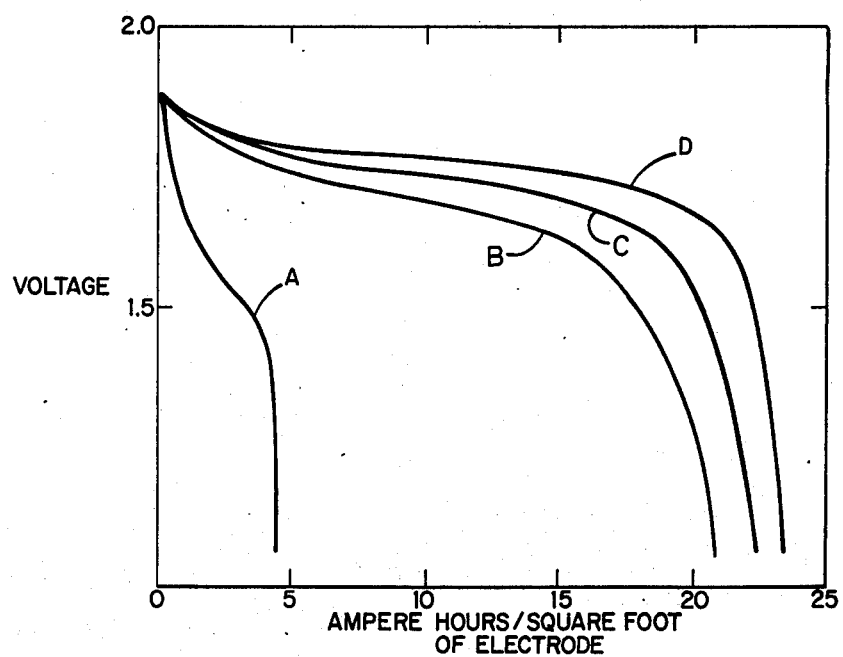

Data obtained from these tests are summarized in FIG. 2. The curves were obtained by measuring ampere hours of current output, at various voltages, for cells which had been charged as described above. For the curve labeled A, the electrolyte consisted of 0.4M $ZnBr_2$ and 0.2M $ZnSO_4$ in water. For B, the electrolyte comprised 0.4M $ZnBr_2$, 0.2M $ZnSO_4$, and 0.4M $(CH_3)_4NBr$ in 9:1 by volume, water to propylene carbonate. The electrolyte of C comprised 0.4M $ZnBr_2$, 0.2M $ZnSO_4$, and 5% by volume N-butyl-N,N-diethyl-N-2-hydroxyethyl ammonium bromide (ECO-2). The electrolyte of D consisted of 0.4M $ZnBr_2$, 0.2M $ZnSO_4$, and 5% by volume N-2-cyanoethyl-N,N,N-triethyl ammonium bromide (ECO-5). These curves demonstrate that a significantly greater number of ampere hours may be obtained from a cell whose electrolyte contains an alcohol or nitrile of the present invention.

Figure 3:
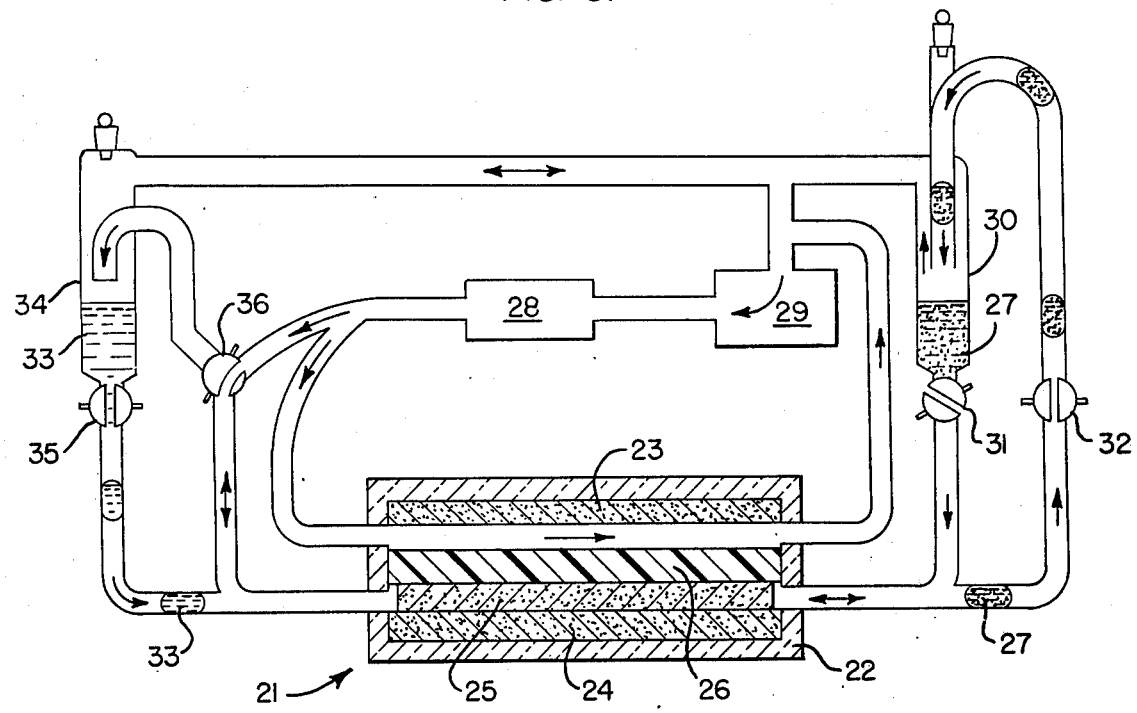
FIG. 3 is a schematic of a regenerative fuel cell with a recirculating electrolyte in which the complexing compounds of the invention are useful; and, FIG. 4 is a cross-sectional view of a battery of the type with which the complexing compounds of the invention are useful.

Referring to FIG. 3, a cell 21 is shown which is a cell with a recirculating electrolyte using the halogen complexing additives described herein. The cell 21 comprises a case 22, a pair of graphite electrodes 23, 24, a graphite felt mass 25, and a porous polymeric separator 26. The equipment for storing the halogen complex 27, and providing fresh electrolyte comprises a pump 28, an electrolyte reservoir 29, a halogen complex reservoir 30, and a pair of valves 31 and 32 for storing and releasing the halogen complex 27. During charge the halogen complex 27 is formed in the felt 25 from either a soluble or insoluble alcohol or nitrile additive of the present invention. The resulting insoluble halogen complex 27 is pumped to reservoir 30 where it can be drained back into felt 25 for discharge. The metal is plated out on electrode 23 during charge with the quality of the plate dependent on flow rate. The use of a water insoluble alcohol or nitrile additive 33 requires a storage reservoir 34 and a pair of valves 35 and 36 for storing and releasing the alcohol or nitrile additive 33. The electrolyte of the cell comprises inorganic salts, such as zinc halide, or cadmium halide, up to 50% of one or more of the compounds described above, and may include 0 to 30% of one or more of various additives for improved plating.

Those skilled in the art will appreciate that complex 27 may be used to drive cells other than the one illustrated in FIG. 3. For example, in addition to zinc and cadmium cells, the complexes will be useful in other halogen utilizing cells which may employ, for example, titanium, chromium, or hydrogen as an anode.

To demonstrate the effect of the compounds of the invention, a cell with a recirculating electrolyte as described above containing ECO-4 was charged at current densities ranging typically from 10 to 60 amperes per square foot for periods of time ranging from 1 to 3 hr. The cell was treated at a constant current drain for a variety of current densities and was demonstrated to have a coulombic efficiency of 50 to 80% and an energy efficiency of 40 to 60%. Without an alcohol or nitrile additive of the present invention no halogen complex 27 is formed and the bromine, which dissolves in the electrolyte, reacts with the zinc plate on electrode 23 resulting in a coulombic and energy efficiency of less than 5%.

The following table illustrates that the halogen complexing property holds for a representative cross-section of the class of compounds of the invention. The data in this table were obtained by mixing the disclosed amount of various halogen complexing species with various amounts of bromine in two flasks, the first flask containing 5 ml of 2M $ZnBr_2$, and the second containing 5 ml of 4M $ZnBr_2$. Partitioning of the bromine complex and the aqueous phase was achieved by vigorous stirring for one-half hour at 25°. Stirring for 18 hours under these conditions was shown to yield identical results. The bromine complex and aqueous phases were then separated by centrifugation and the aqueous phase was titrated for bromine.

TABLE 1

| Complexing Compound | mM $Br_2$ | % $Br_2$ partitioning in 5 ml aqueous phase with: | |
|---|---|---|---|
| | | 2M $ZnBr_2$ | 4M $ZnBr_2$ |
| 1) QmBr* (3.28 mM) | 9.84 | (11%)+ | (6%)+ |
| 2) QmBr* (3.28 mM) Sulfolane (400mg) | 9.84 | 13% | 9% |
| 3) ECO-1 (3.28 mM) | 9.84 | 13% | 12% |
| 4) ECO-2 (3.28 mM) | 9.84 | 13% | 9% |
| 5) ECO-3 (3.28 mM) | 9.84 | 14% | 10% |
| 6) ECO-4 (3.28 mM) | 9.84 | 15% | 15% |
| 7) ECO-5 (3.28 mM) | 9.84 | 12% | 11% |
| 8) ECO-6 (3.28 mM) | 9.84 | 6% | 10% |

*QmBr is phenyl trimethyl ammonium bromide.
Sulfolane is tetramethylene sulfone.
+The quaternary ammonium polybromide phase was crystalline.

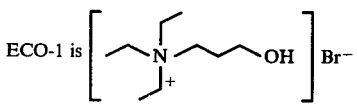

TABLE 1-continued

| Complexing Compound | mM $Br_2$ | % $Br_2$ partitioning in 5 ml aqueous phase with: | |
|---|---|---|---|
| | | 2M $ZnBr_2$ | 4M $ZnBr_2$ |

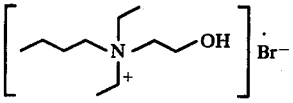

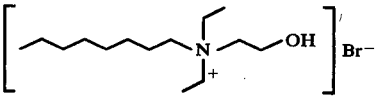

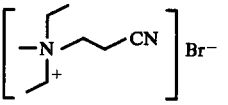

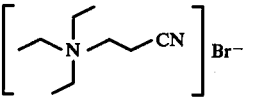

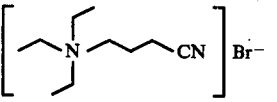

ECO-1: N-3-Hydroxypropyl-N,N,N-triethyl ammonium bromide
ECO-2: N-Butyl-N,N-diethyl-N-2-hydroxyethyl ammonium bromide
ECO-3: N,N-Diethyl-N-2-hydroxyethyl-N-octyl ammonium bromide
ECO-4: N-2-Cyanoethyl-N,N-diethyl-N-methyl ammonium bromide
ECO-5: N-2-Cyanoethyl-N,N,N-triethyl ammonium bromide
ECO-6: N-3-Cyanopropyl-N,N,N-triethyl ammonium bromide As can be seen from Table 1, the flasks containing the alcohol and nitrile compounds of the invention (ECO-1 through 6), unlike phenyl trimethyl ammonium bromide, are liquids and not crystalline in the polybromide form and are therefore capable of being rapidly discharged electrochemically. The amount of bromine complexed by ECO-1 through 6 is comparable with the quaternary ammonium salt - aprotic dipole (sulfolane) system of example 2.

Figure 4:
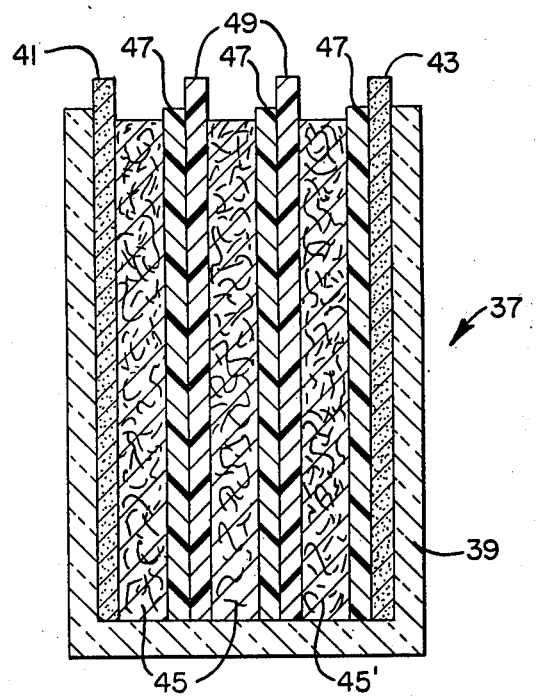

FIG. 4 depicts a bipolar, multi-celled battery 37 of the type which utilizes the additive of the invention. It comprises a glass, water-tight case 39 which encloses a pair of graphite plate current collectors 41, 43. Plate 43 serves as the metal electrode. Interposed between the current collectors 41, 43 is an array of graphite felt masses 45 which serve as counter electrodes. A porous polymeric separate or 47 (Daramic, approximately 0.125 in. thick) and a bipolar electrode 49 (conductive polymer film made by Conductive Polymer Corporation, Marblehead, Mass., approximately 0.020 in. thick) are in turn interposed between each graphite felt mass 45. The number of cells in the battery, of course, may be increased or decreased as desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:
1. A process for improving the performance of current delivering electrochemical systems of the type which utilize a substance selected from the group consisting of bromine, chlorine, iodine, polyhalogen complexes, and mixtures thereof as its electrochemically active agent, said process comprising adding to the electrolyte of said system an additive comprising an alcohol or nitrile, which exists as a relatively insoluble liquid in aqueous metal halide solutions at 30° C in the presence of one and more than one molar equivalent of halogen for every alcohol or cyano group in the additive, said additive being selected from the group consisting of compounds having the formulae:

where R is an aliphatic group containing 1 to 8 carbon atoms, m is a number from 1 to 6, and Z is any chemical functionality which does not render the additive's halogen complex crystalline at 30° C.

2. The process as set forth in claim 1 wherein Z is selected from the group consisting of alkyls, amides, carbocycles, carboxylates, halocarbons, halides, hydrogen, phosphonates, siloxanes, sulfonates, sulfones, sultones, and combinations thereof.

3. The process as set forth in claim 1 wherein Z is selected from the group consisting of halogen complexing functionalities.

4. The process as set forth in claim 3 wherein Z is selected from the group consisting of ammoniums, ammonium hydrohalides, amidimidines, amine oxides, betaines, esters, ethers, phosphobetaines, phosphoniums, pyridiniums, pyridyls, quaternary ammoniums, quaternary O-alkyl hydroxylammoniums, sulfobetaines, sulfoniums, sydnones, tertiary amines, tertiary amine hydrohalides, and combinations thereof.

5. The process as set forth in claim 1 where the additive is selected from the group consisting of:
N-3-Hydroxypropyl-N,N,N-triethyl ammonium bromide
N-Butyl-N,N-diethyl-N-2-hydroxyethyl ammonium bromide
N,N-Diethyl-N-2-hydroxyethyl-N-octyl ammonium bromide
N-2-Cyanoethyl-N,N-diethyl-N-methyl ammonium bromide
N-2-Cyanoethyl-N,N,N-triethyl ammonium bromide
N-3-Cyanopropyl-N,N,N-triethyl ammonium bromide.

6. An electrochemical cell comprising a case, a porous, conductive halogen electrode, an Me electrode where Me is selected from the group consisting of zinc and cadmium, an aqueous electrolyte containing an inorganic salt of the formula MX, where M is selected from the group consisting of cadmium and zinc and X is chosen from the group consisting of bromide, chloride, iodide, or combination of these halide ions, and an additive dissolved in said electrolyte comprising a compound, which exists as a relatively insoluble liquid in aqueous metal halide solutions at 30° C in the presence of one or more than one molar equivalent of halogen for every alcohol or cyano group in the additive, said additive being selected from the group consisting of compounds having the following structural formulae:

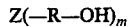

where R is an aliphatic group containing 1 to 8 carbon atoms, m is a number from 1 to 6, and Z is any chemical functionality which does not render the additive's halogen complex crystalline at 30° C.

7. The cell as set forth in claim 6 wherein Z is selected from the group consisting of alkyls, amides, carbocycles, carboxylates, halocarbons, halides, hydrogen, phosphonates, siloxanes, sulfonates, sulfones, sultones, and combinations thereof.

8. The cell as set forth in claim 6 wherein Z is selected from the group consisting of halogen complexing functionalities such as ammoniums, ammonium hydrohalides, amidimidines, amine oxides, betaines, esters, ethers, phosphobetaines, phosphoniums, pyridiniums, pyridyls, quaternary ammoniums, quaternary O-alkyl hydroxylammoniums, sulfobetaines, sulfoniums, sydnones, tertiary amines, tertiary amine hydrohalides, and combinations thereof.

9. The cell as set forth in claim 6 wherein said additive is a compound selected from the group consisting of:
N-3-Hydroxypropyl-N,N,N-triethyl ammonium bromide
N-Butyl-N,N-diethyl-N-2-hydroxyethyl ammonium bromide
N,N-Diethyl-N-2-hydroxyethyl-N-octyl ammonium bromide
N-2-Cyanoethyl-N,N-diethyl-N-methyl ammonium bromide
N-2-Cyanoethyl-N,N,N-triethyl ammonium bromide
N-3-Cyanopropyl-N,N,N-triethyl ammonium bromide.

10. The cell as set forth in claim 6 wherein said cell is a secondary cell.

11. The cell as set forth in claim 6 wherein said cell is a primary cell.

12. The cell as set forth in claim 6 further comprising means for storing the complex produced during charging to enable said cell to functions as a fuel cell.

13. The cell as set forth in claim 12 further comprising means for recirculating the electrolyte.

14. The cell as set forth in claim 13 further comprising means for storing said additive.

15. A water insoluble liquid complex substantially insoluble in water at 30° C for use in electrochemical cells of the type which utilizes a halogen selected from the group consisting of chlorine, bromine, iodine, polyhalogen complexes, and mixtures thereof, said complex consisting essentially of a substance selected from the group consisting of chlorine, bromine, iodine, polyhalogen complexes, and mixtures thereof combined with an additive comprising an alcohol or nitrile, which exists as a relatively insoluble liquid in aqueous metal halide solutions at 30° C in the presence of one and more than one molar equivalent of halogen for every alcohol or cyano group in the additive, said additive being selected from the group consisting of compounds having the formulae:

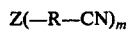

where R is an aliphatic group containing 1 to 8 carbon atoms, m is a number from 1 to 6, and Z is any chemical functionality which does not render the additive's halogen complex crystalline at 30° C.

16. The complex as set forth in claim 15 wherein Z is selected from the group consisting of alkyls, amides, carbocycles, carboxylates, halocarbons, halides, hydrogen, phosphonates, siloxanes, sulfonates, sulfones, sultones, and combinations thereof.

17. The complex as set forth in claim 15 wherein Z is selected from the group consisting of halogen complexing functionalities.

18. The complex as set forth in claim 15 wherein Z is selected from the group consisting of ammoniums, ammonium hydrohalides, amidimidines, amine oxides, betaines, esters, ethers, phosphobetaines, phosphoniums, pyridiniums, pyridyls, quaternary ammoniums, quaternary O-alkyl hydroxylammoniums, sulfobetaines, sulfoniums, sydnones, tertiary amines, tertiary amine hydrohalides, and combinations thereof.

19. The complex as set forth in claim 15 wherein Z is selected from the group consisting of:
N-3-Hydroxypropyl-N,N,N-triethyl ammonium bromide
N-Butyl-N,N-diethyl-N-2-hydroxyethyl ammonium bromide
N,N-Diethyl-N-2-hydroxyethyl-N-octyl ammonium bromide
N-2-Cyanoethyl-N,N-diethyl-N-methyl ammonium bromide
N-2-Cyanoethyl-N,N,N-triethyl ammonium bromide
N-3-Cyanopropyl-N,N,N-triethyl ammonium bromide.

20. A battery of the type including a casing, an Me electrode, where Me is a metal selected from the group consisting of cadmium and zinc, a plurality of counter electrodes spaced apart from said Me electrode, a bipolar electrode interposed between each adjacent pair of said counter electrodes, an aqueous electrolyte containing an inorganic salt of the formula MX, where M is selected from the group consisting of bromide, chloride, iodide, and combinations thereof, and an additive in said electrolyte comprising an alcohol or nitrile, which exists as a relatively insoluble liquid in aqueous metal halide solutions at 30° C in the presence of one and more than one molar equivalent of halogen for every alcohol or cyano group in the additive, said additive being selected from the group consisting of compounds having the formulae:

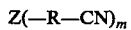

$$Z(-R-CN)_m$$

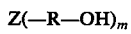

$$Z(-R-OH)_m$$

where R is an aliphatic group containing 1 to 8 carbon atoms, m is a number from 1 to 6, and Z is any chemical functionality which does not render the additive's halogen complex crystalline at 30° C.

21. The battery as set forth in claim 20 wherein Z is selected from the group consisting of alkyls, amides, carbocycles, carboxylates, halocarbons, halides, hydrogen, phosphonates, siloxanes, sulfonates, sulfones, sultones, and combinations thereof.

22. The battery as set forth in claim 20 wherein Z is selected from the group consisting of halogen complexing functionalities.

23. The battery as set forth in claim 20 wherein said additive is a compound selected from the group consisting of:
N-2-Hydroxypropyl-N,N,N-triethyl ammonium bromide
N-Butyl-N,N-diethyl-N-2-hydroxyethyl ammonium bromide
N,N-Diethyl-N-2-hydroxyethyl-N-octyl ammonium bromide
N-2-Cyanoethyl-N,N-diethyl-N-methyl ammonium bromide
N-2-Cyanoethyl-N,N,N-triethyl ammonium bromide
N-3-Cyanopropyl-N,N,N-triethyl ammonium bromide.

24. The battery as set forth in claim 20 further comprising means for storing the complex produced during charging.

* * * * *